May 24, 1938.　　F. A. PARSONS ET AL　　2,118,358
MACHINE TOOL
Filed Nov. 4, 1936　　8 Sheets-Sheet 2
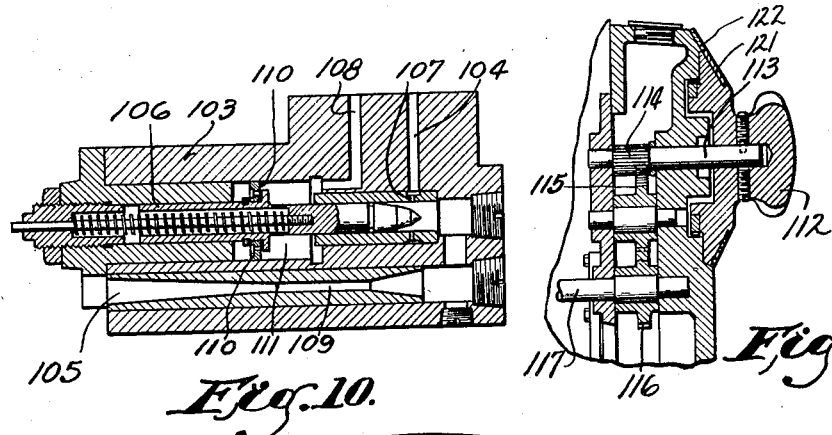
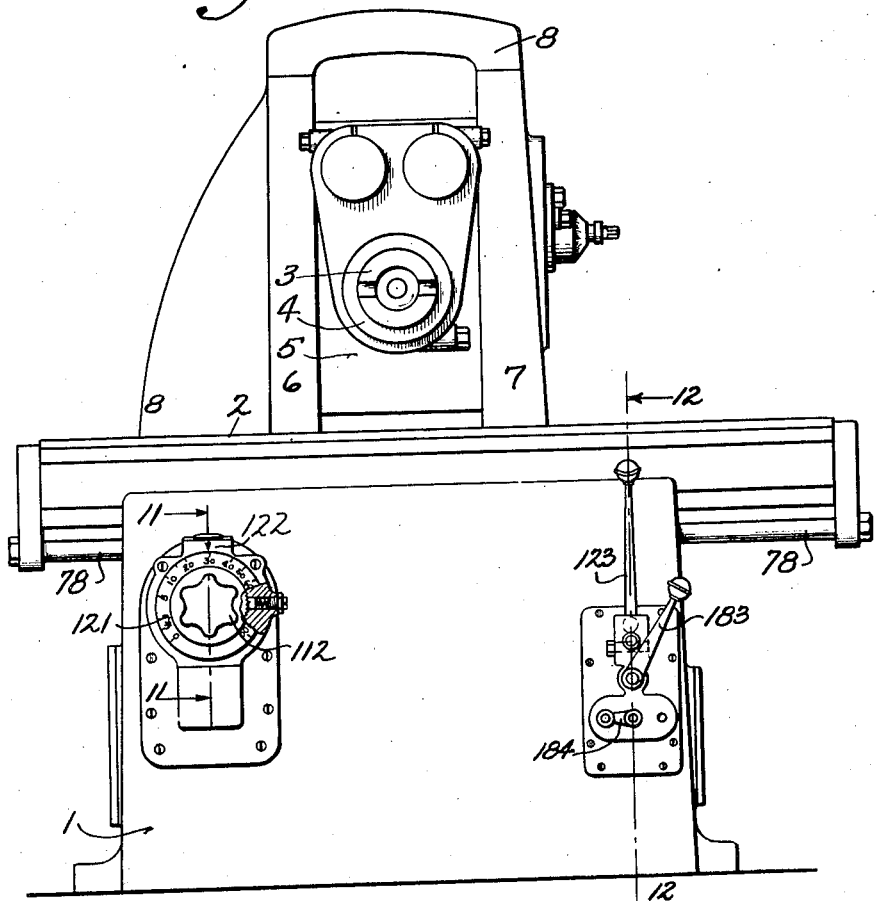
INVENTORS
Fred G. Parsons
Walter M. Pohl
BY
ATTORNEYS.
Fred G. Parsons

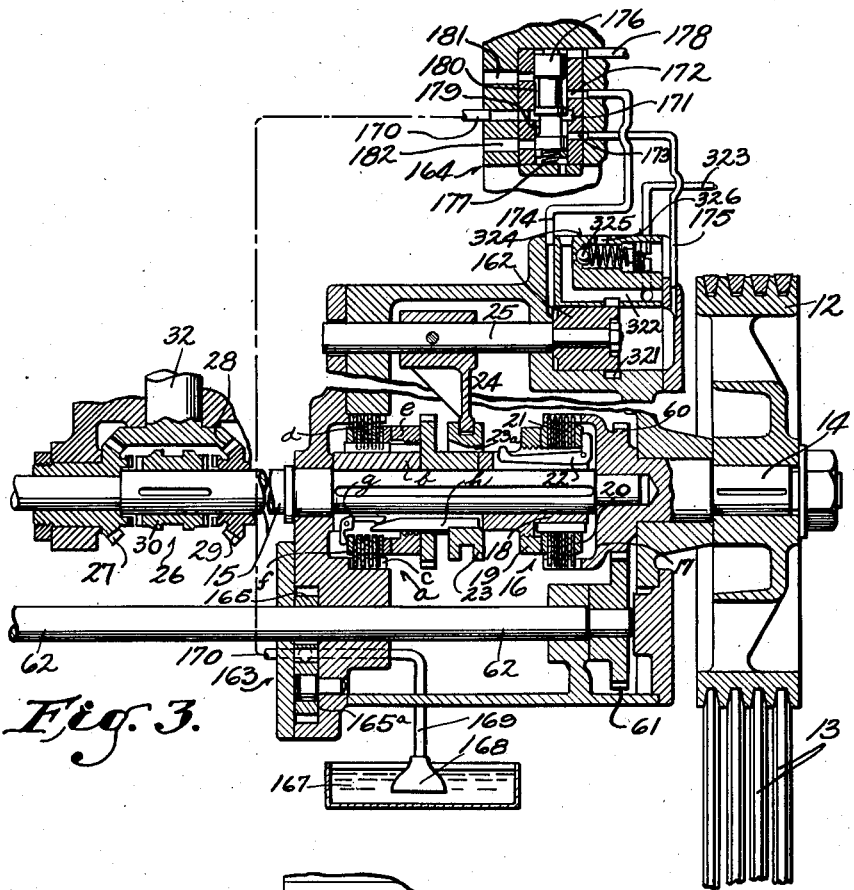
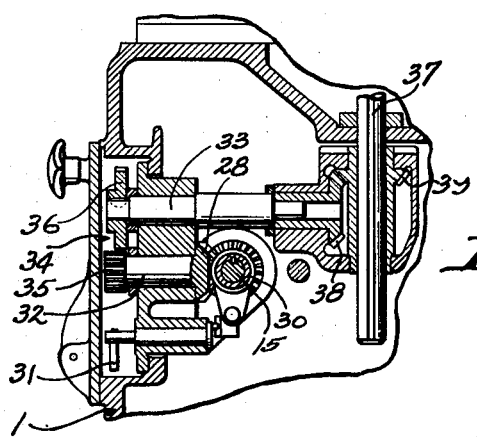
Fig. 3.
Fig. 4.

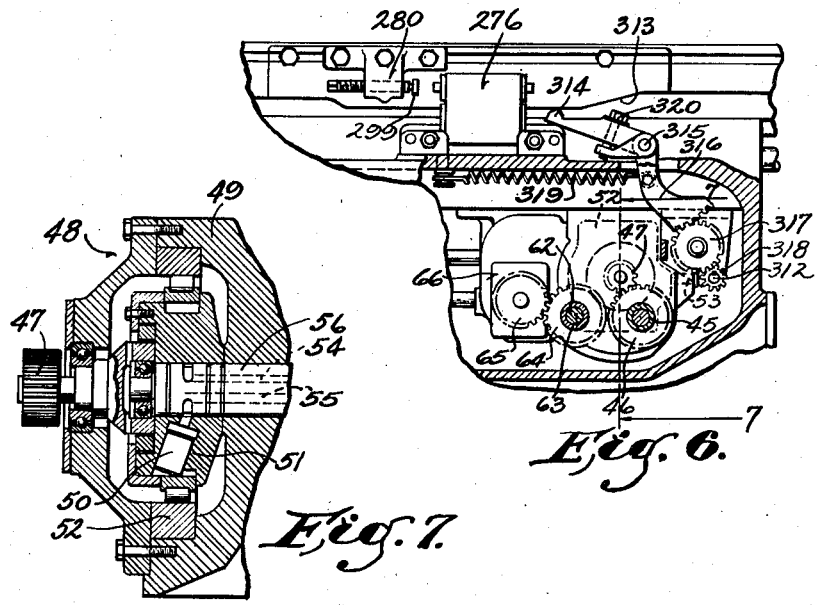
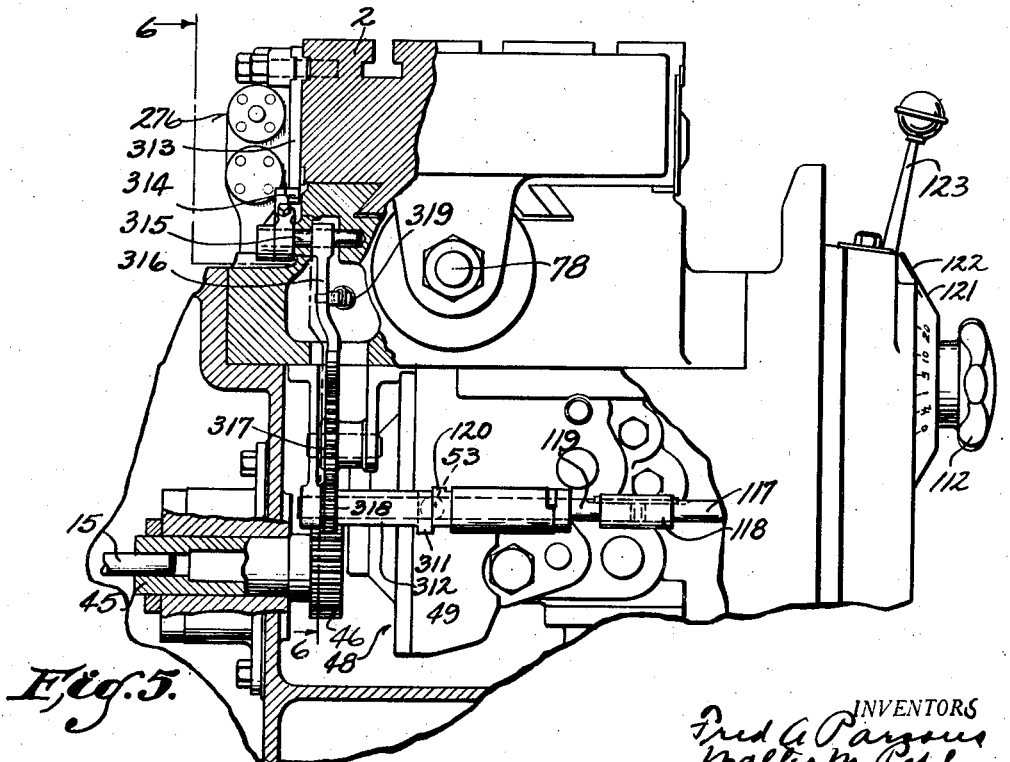

May 24, 1938.   F. A. PARSONS ET AL   2,118,358
MACHINE TOOL
Filed Nov. 4, 1936   8 Sheets-Sheet 5

INVENTORS
Fred G. Parsons
BY Walter M. Pohl
ATTORNEYS.
Fred G. Parsons

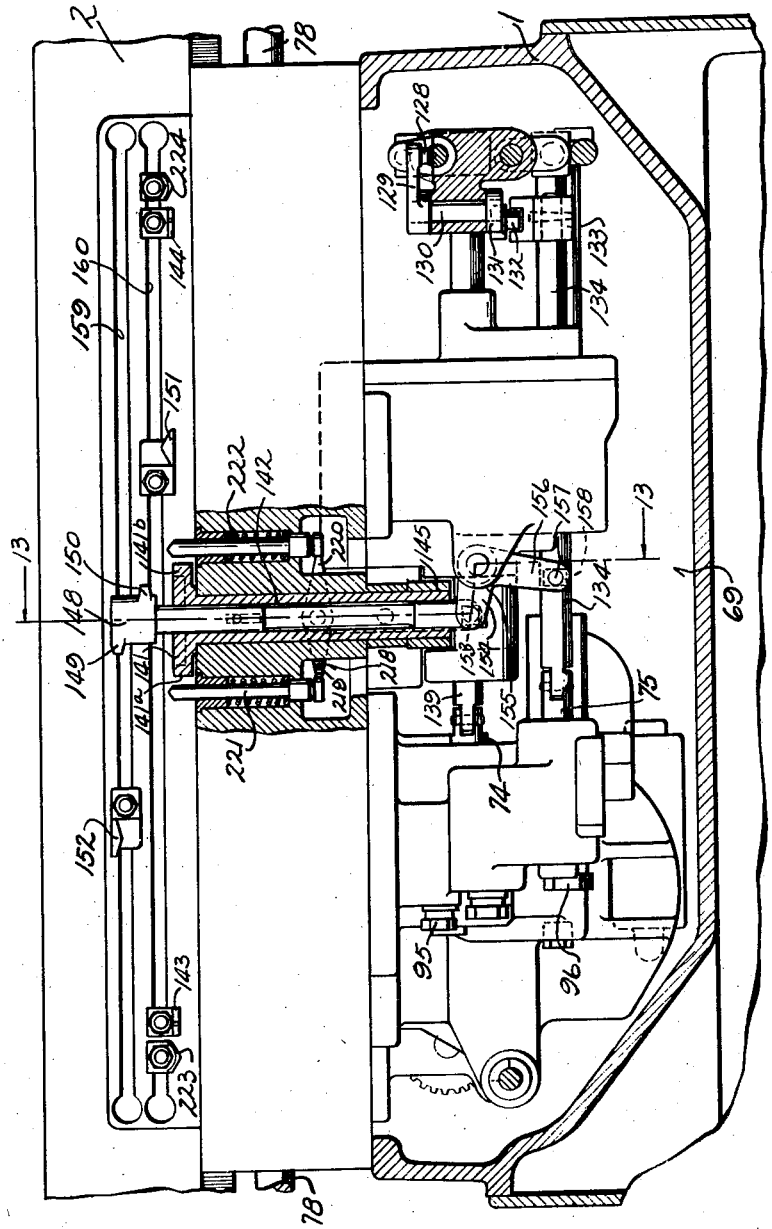

May 24, 1938.  F. A. PARSONS ET AL  2,118,358

MACHINE TOOL

Filed Nov. 4, 1936  8 Sheets-Sheet 7

Patented May 24, 1938

2,118,358

UNITED STATES PATENT OFFICE 2,118,358

MACHINE TOOL

Fred A. Parsons, Milwaukee, Wis., and Walter M. Pohl, Washington, D. C., assignors to Kearney & Trecker Corporation, West Allis, Wis., a corporation of Wisconsin Application November 4, 1936, Serial No. 109,112

32 Claims. (Cl. 90—21)

This invention relates to machine tools and more particularly to transmission and control mechanism therefor, especially for milling machines.

A purpose of the invention is to provide an improved transmission mechanism particularly of the hydraulic type, and controls therefor, which may be used for either hand or automatic operation of a machine tool, and for machine movements involving both hand and automatic controls, particularly for a milling machine.

A particular object is to supplement the invention of a co-pending application Serial No. 43,488 filed October 4, 1935, Patent 2,077,435, April 20, 1937, with further inventions and improvements directed toward the same general type of machine tool transmission and control mechanism as is there shown and usable in combination therewith or supplementary thereto.

Further purposes relate to improved transmission and control mechanism including improved means for the automatic reversal of machine movements without use of lost motion mechanical snap-over devices, and including improved automatic reverse means for effecting improved accuracy of reversal at a predetermined point of forward movement; and in which the direction and the alternative selection of feed or quick traverse rates are determined by separate and individually operable controllers, but other control means may operate for the improved simultaneous control of rate and direction; especially for hydraulically actuated machine tool tables; and including an improved control for the main clutch of the machine, and interconnected in an improved manner with other transmission and control mechanism of the machine, and especially for milling machines.

A further purpose is to provide an improved control mechanism at least in part hydraulically operated for some or all of the control purposes previously mentioned and especially where some of the control mechanism of the machine is manually operated, and particularly for a milling machine.

A further purpose is to provide a transmission and control mechanism effective for some or all of the improved results obtained by the mechanism shown in other co-pending applications, Serial No. 36,766, filed August 19, 1935, Patent 2,077,434, April 20, 1937, and Serial No. 65,774 filed February 26, 1936, but in a form particularly adapted for hydraulically actuated machine tools, and especially for milling machines.

A further purpose is generally to simplify and improve the construction and operation of machine tools, and particularly of milling machines, and still other purposes will be apparent from the accompanying description and claims.

The invention consists in the construction and combination of parts as herein illustrated, described and claimed and in such modifications of the structures illustrated and described as are equivalent to the structure of the claims.

Like characters have been used to indicate the same parts throughout this specification, and in the drawings.

Fig. 2 is a front elevation of the same machine.

Fig. 3 is a sectional development of certain drive mechanism of the machine in enlarged scale.

Fig. 4 is an enlarged partial vertical section taken approximately along line 4—4 of Fig. 1 and enlarged.

Fig. 5 is an enlarged partial elevation, partly in section, of the front portion of the machine as viewed from the left of Fig. 2.

Fig. 6 is a portion viewed approximately from the line 6—6 of Fig. 5, in reduced scale, and partly in section.

Fig. 7 is a section through a pump of the machine, taken approximately along line 7—7 of Fig. 6, and enlarged.

Fig. 9 is a partial front elevation of the machine, partially in section along a line approximately corresponding to the line 9—9 of Fig. 1, and enlarged, the table portion being shown with a front cover removed.

Fig. 10 is an enlarged sectional view of a back pressure valve device used in the machine.

Fig. 11 is an enlarged sectional development taken approximately along the line 11—11 of Fig. 2.

Figure 1:
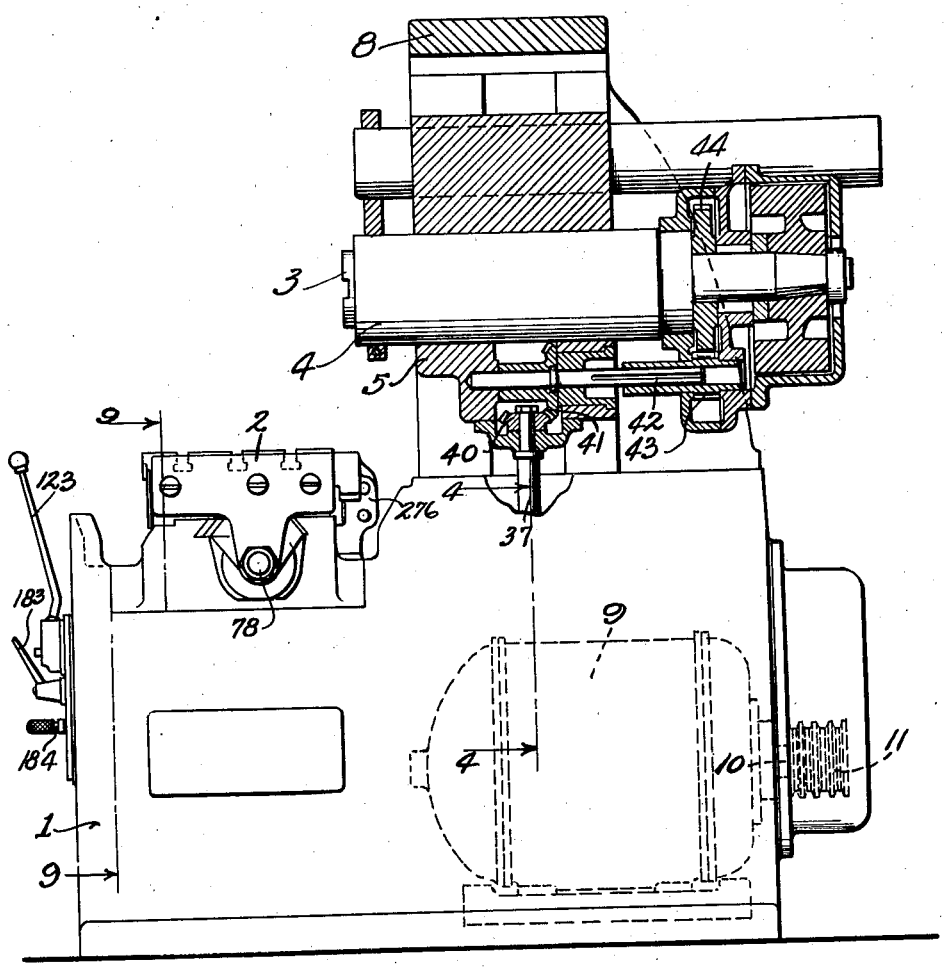
Fig. 1 is a right side elevation, partly in section, of a milling machine incorporating the invention.

The machine here shown is a milling machine which includes a base or support 1, Fig. 1, a work table or support 2 slidably guided on base 1, a tool spindle or support 3 rotatably carried by a quill or support 4 slidably keyed and guided for transverse adjustment together with spindle 3 in a carrier or support 5. The carrier 5 is guided for bodily vertical movement together with quill 4 and spindle 3 between side members 6, 7, Fig. 2, which are rigidly fixed on bed 1 and fixed together at the top by a member 8.

The guides for the various members may be of any suitable form and therefore are not shown in detail. For the carrier 5 and quill 4 there are provided suitable manual means for the movement thereof and suitable clamp means operative in their several positions. Such moving and clamping means being old are not here shown.

Transmission mechanism for rotation of spindle 3 includes a primary motion source such as an electric motor 9, Fig. 1, carried by base 1, and having a drive shaft 10 carrying a pulley 11, which drives a pulley 12, Fig. 3, through belt means 13. Pulley 12 is fixed on a shaft 14 and drives a co-axial shaft 15 through a clutch generally denoted by the numeral 16, the clutch including an outer member 17, an inner member 18, an adjustable abutment 19, a movable abutment 20, and a series of friction plates 21 alternately keyed to the outer and inner clutch members and slidable into mutual friction engagement by a pivoted lever 22, which is operated by suitable cam surfaces 23a on a clutch spool 23 shiftable by a fork member 24 fixed on a shifter rod 25 which is movable by means later described.

Shaft 15, at an intermediate point, carries a spindle reverser, generally denoted by the numeral 26, Fig. 3, comprising meshed bevel gears 27, 28, 29, the gears 27, 29 having clutch teeth alternatively engageable by complementary clutch teeth on a clutch member 30 slidably keyed on shaft 15, and which may be shifted by a manually operable lever 31, Fig. 4, connected therewith by any suitable means, such as the eccentric and fork there shown. The driven gear 28 is fixed on a shaft 32, Fig. 4, which drives a shaft 33 through a spindle rate changer, generally denoted by the numeral 34, comprising a plurality of differently diametered gear pairs such as the gears 35, 36 removably and interchangeably fixed on the different shafts. Shaft 33 drives a vertical shaft 37 through bevel gears 38, 39. Shaft 37, Fig. 1, drives spindle 3 through bevel gears 40, 41, extensible coupling 42, pinion 43 and a gear 44 which is fixed on the spindle.

The spindle train is provided with a brake, generally denoted by the reference letter a, Fig. 3, which includes an inner member b, keyed to shaft 15, an outer member c fixed with base 1, a series of friction plates d, alternately keyed to the outer and inner members, an adjustable abutment e, a movable abutment f, and a pivoted lever g, which is moved to press the friction plates into mutual engagement by a member h fixed on the clutch spool 23.

The arrangement of clutch 16 and brake a is such that in the one direction of movement of shifter rod 25, Fig. 3, the clutch 16 is engaged to start spindle 3 and the other direction of movement of the rod engages brake a.

The table 2 is alternatively driven through feed and quick traverse trains. The table feed train is driven from motor 9 through the main clutch 16, Fig. 3, and the shaft 15, the shaft 15 being extended to drive a sleeve 45, Figs. 5, 6, upon which is fixed a gear 46 meshing with a pump drive gear 47, which drives a feed pump generally indicated by the numeral 48, Fig. 7, housed within a unit 49, and fixed on bed 1. Feed pump 48 may be any of several well known types, but as here shown includes a plurality of pistons such as 50 bodily rotatable with a member 51 which is driven from gear 47, and having more or less pumping stroke accordingly as a member 52 is shifted to the right or left in Fig. 6, the member 52 being continuously pressed by springs, not shown, in the one direction and shifted in the other direction by the movement of a control plunger or rod 53 Figs. 5, 6, by means of mechanism later described.

Fluid is led to and away from the pistons 50 of feed pump 48 through channels 54, 55, Fig. 7 in a pintle 56 upon which member 51 is mounted for rotation, the respective channels being connected to receive fluid from a supply channel 57 diagrammatically indicated in Fig. 8, and to deliver fluid to a channel 58 leading to table control mechanism generally denoted by the numeral 59, Fig. 8 which will be later described.

The quick traverse table train is driven from motor 9 to exclude clutch 16, Fig. 3, through a pair of gears 60, 61, a shaft 62 which extends forwardly to engage a sleeve 63, Fig. 6, similarly to the engagement of shaft 15 with the sleeve 45 previously described. Fixed on sleeve 63 is a gear 64 meshed with a pump gear 65 which drives a quick traverse pump generally indicated by the numeral 66, Figs. 6, 8, and which may be of any suitable form such as intermeshed gears 67, 68 diagrammatically shown in Fig. 8, the pump having inlet and outlet ports respectively connected to receive fluid from a reservoir 69, Figs. 8, 9, 'n base 1 and to deliver fluid to the feed pump supply channel 57 and also to a channel 70 which, like the feed pump channel 58, is connected to the table control mechanism 59, Fig. 8 which will be later described.

Figure 8:
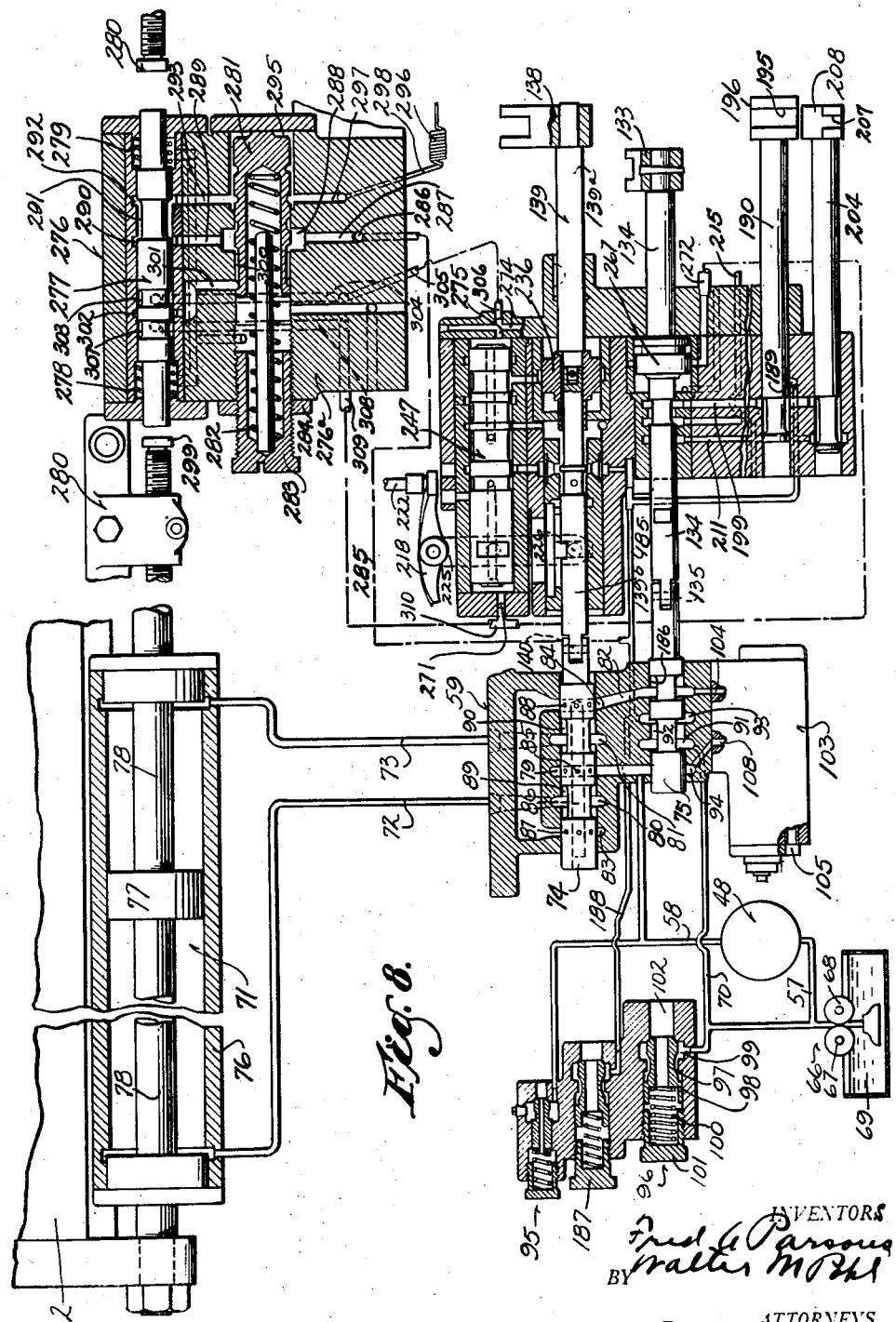
Fig. 8 is a semi-diagrammatic development of certain transmission and control mechanism of the machine.

Fluid from the pumps 48, 66, Fig. 8 may be delivered through the control mechanism 59 to actuate a table motor, generally denoted by the numeral 71, through the channels 72 or 73, according to the position of a reverser device including a reverser valve generally denoted by numeral 74, Figs. 8, 9, and a feed or quick traverse rate selector including a rate selector valve 75, Figs. 8, 9, the motor 71 including a cylinder 76, a piston 77, and a piston rod 78 which is fixed with table 2.

The various control connections of the table control mechanism 59, Fig. 8, are as follows:

Feed pump fluid from channel 58 passes to a port 79, Fig. 8, of reverser valve 74, which also includes ports 80, 81 respectively connected to the channels 72, 73 leading to table motor 71. In the central position of reverser valve 74, as shown in Fig. 8, the fluid from port 79 cannot reach either port 80, 81, and the table motor 71 and table 2 are locked in position by the fluid on each side of piston 77 which then cannot escape past valve 74. In this central valve position the fluid from port 79 is by-passed to an outlet channel 82 through ports 83, 84, to which it passes through transverse holes 85, an axial bore 86 and the transverse holes 87 or 88.

But if the reverser valve 74, Fig. 8, is shifted to right or left of the position in Fig. 8, one or the other of the ports 80, 81 which connect to channels 72, 73 respectively will receive fluid from port 79 through one of the annular grooves 89, 90, and the other port 80, 81 will deliver fluid to one of the ports 83, 84 and outlet channel 82 through the other annular groove 89, 90. Thus the motor 71 and table 2 will be moved in the one direction or the other according to the position of valve 74.

Quick traverse pump fluid from channel 70, Fig. 8, passes to a port 91 of valve 75. The valve 75 has two positions, namely, the feed rate position shown in Fig. 8, in which the fluid from port 91 passes through an annular groove 92 to a port 93 to be used for various purposes, as later described, and another position, to the left of that shown in Fig. 8, in which the fluid from port 91 passes through groove 92 to a port 94, which communicates with the port 79 of the reverser valve 74. In the latter case the fluid delivered from channel 70 will be added to that delivered from channel 58 to produce relatively fast table movement in either direction as controlled by reverser valve 74 as previously described.

The pumps 48, 66 are respectively provided with overload relief valves 95, 96, Figs. 8, 9 which are of similar construction and therefore only the valve 96 will be described in detail. Valve 96 includes a plunger member 97 having an enlarged portion 98 acting as a piston and continuously urged by the fluid pressure of the pump applied through a port 99, the plunger movement being opposed by pressure of a spring 100, which may be adjusted by a threaded member 101 to vary the pressure. When the fluid pressure exceeds the maximum determined by the adjustment of member 101 the port 99 is opened to a channel 102 to permit fluid to return to reservoir 69.

The connections of the overload valves 95, 96 Fig. 8 to the pumps 48, 66 and to the control valve 75 is such that when the table 2 is operating at a feed rate the valve 95 controls the maximum table load capacity, while at quick traverse rate both the valves 95, 96 are connected to both the pumps, and the load capacity is governed by whichever valve is adjusted for least pressure. Ordinarily this would be the valve 96.

It will be noted that, although both the feed pump and the quick traverse pump are supplying fluid to table motor 71 during quick traverse movements, the quick traverse rate will remain the same, irrespective of the feed pump delivery setting, for the reason that the entire volume supplied to the motor will be only that which is constantly delivered by the quick traverse pump. This is because the feed pump draws its fluid from the outlet channel of the quick traverse pump as above pointed out.

It may also be noted that there is no point in the movement of the rate selector valve 75 in which the table 2 can stop movement, fluid being continuously supplied to the table motor unless the reverser valve 74 is in stop position.

An automatic back pressure control device 103, Figs. 8, 10 is serially connected with the table motor outlet channel 82, the fluid passing through the device from a channel 104, which communicates with channel 82, to an outlet 105 and thence to the reservoir 69. The device 103 is substantially the same in construction and operation as the back pressure device shown in a co-pending application Serial No. 32,541 filed July 22, 1935 and therefore will not be described in detail. It includes a throttle plunger 106 spring urged in a direction to close throttle openings such as 107, and urged in the other direction by fluid pressure opposing the spring pressure and derived through a channel 108 from the channel 94, which as previously explained leads to the forward or inlet side of motor 71 in either direction of motor operation. Back pressure device 103 also includes a restricted passage 109 supplementing the effect of throttle plunger 106, and a piston means 110 operating in a liquid filled chamber 111 to prevent axial vibration or chatter of plunger 106. The effect of device 103 is to maintain sufficient back pressure on the motor 71 to prevent overrun under all conditions of machine operation and particularly when the cutter tends to set up a negative pressure or vacuum in the forward or motor supply channel, and to automatically reduce the back pressure as the pressure in forward channel 94 increases and vice-versa, whereby to avoid power waste, heating, and other undesirable results of a constantly high back pressure.

Feed pump 48, Fig. 8 is manually adjustable to change the feed rate by mechanism as follows: A manually operable member 112, Figs. 2, 5, 11 is connected for movement of the pump control plunger 53, previously described, through a shaft 113, pinion 114, an intermediate gear 115, a gear 116, shaft 117, a coupling 118, a shaft 119 and an eccentric cam member 120 which operates against the exposed end of the plunger 53. As the member 112 is turned in the one or the other direction plunger 53, which is spring pressed together with member 52 as previously explained, follows the contour of cam member 120 thus altering the stroke of the feed pump pistons. Associated with member 112 is an indicating device consisting of a graduated dial 121 movable against an indicator 122 which indicates on the dial the rate resulting from the various positions of the adjusting means.

Figure 12:
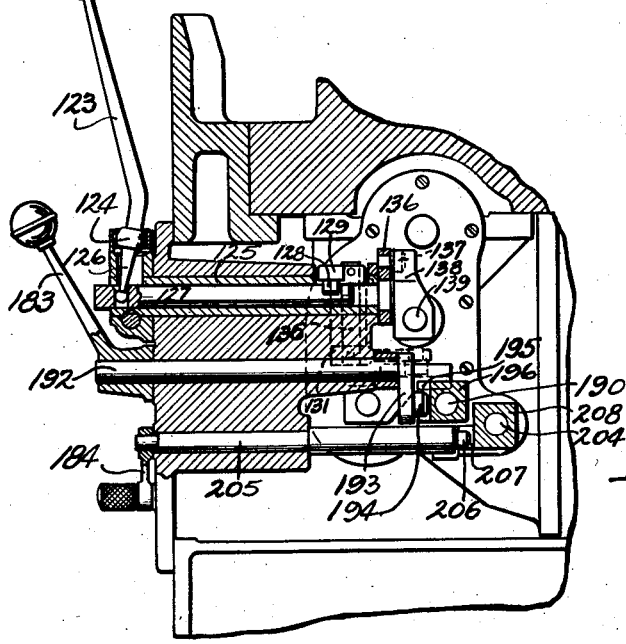
Fig. 12 is an enlarged partial section taken approximately along the line 12—12 of Fig. 2.

The reverser and selector valves 74, 75, are each movable from a lever 123, Figs. 2, 12. Lever 123 when oscillated to right or left in Fig. 12 shifts selector valve 75, Fig. 8, through a pivot 124 carried by a sleeve 125, an arm 126 engaging a rod 127, a pin 128, Figs. 9, 12, a lever 129, a shaft 130, another lever 131, and a pin 132 engaging a member 133 fixed on a shifter rod 134, Figs. 8, 9 the shifter rod 134 being co-axial with the valve 75, and coupled therewith by a pin 135.

Lever 123, when oscillated to right or left in Fig. 2 shifts reverser valve 74, Fig. 8, through sleeve 125, Fig. 12, a lever 136, a pin 137 and a member 138 fixed on a shifter rod 139, Figs. 8, 12, which for convenience is made in two parts 139a, 139b, joined together, and coaxial with valve 74 to which the shifter rod is coupled by a pin 140.

For dog operation of the reverser valve 74, Fig. 8 there is provided a trip member 141, Fig. 9, having oppositely extended dog abutment portions 141a, 141b fixed on a sleeve 142, and alternatively rotatable into the path of movement of table dogs such as 143, 144. A lever 145 Figs. 9, 13, 14 fixed on sleeve 142 carries a pin 146 engaging a slot 147 in the shifter rod 139 which is connected to reverser valve 74 as previously described.

When reverser valve 74 is in central or table stop position both the abutment members 141a, 141b are withdrawn out of the path of dog movement but when the valve is shifted to establish movement of table 2 the one or the other abutment is swung forward into the path of dog movement, and will be contacted by a dog during table movement to return the valve to central position, thereby stopping the table.

Figure 13:
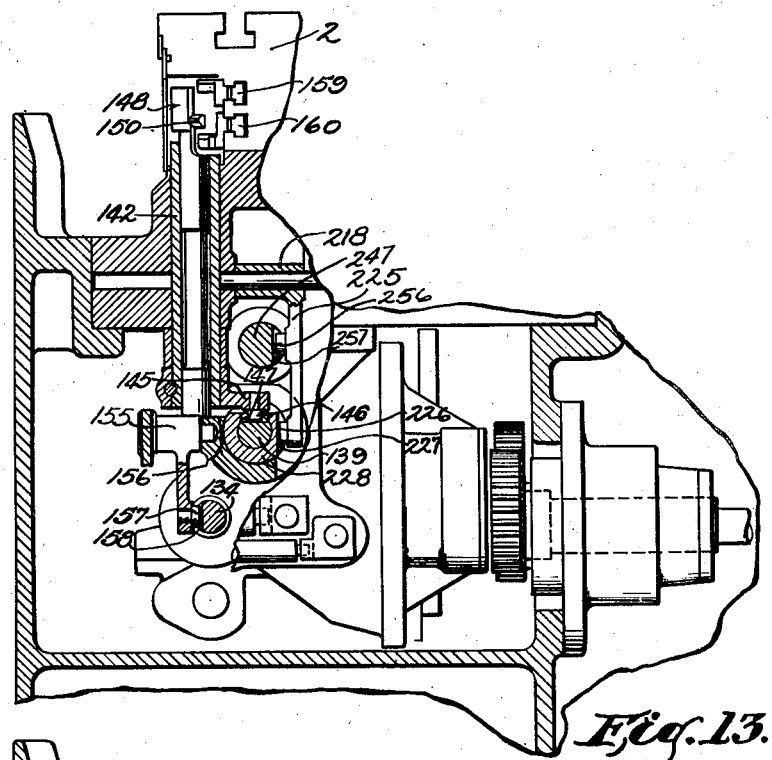
Fig. 13 is a partial section taken approximately along the line 13—13 of Fig. 9.

For dog operation of feed and quick traverse selector valve 75, Fig. 8, there is provided a trip post 148, Figs. 9, 13, having a plurality of dog abutment members 149, 150, the post being slidably keyed in the sleeve 142 to oscillate with the sleeve but having individual vertical movement.

When the sleeve 142 is in the position corresponding to the central or table stop position of reverser valve 74, both abutments 149, 150 are withdrawn out of dog contacting position, but during table movement one or the other of the abutments is swung forward and may then be contacted by dogs such as dogs 151, 152 respectively adapted for upward and downward post movement. A pin 153 is fixed in an arm 154 of a pivoted lever 155 and engages a suitable groove in the lower end of post 148, the lever 155 having another arm 156 carrying a pin 157 which engages a slot 158 in the shifter rod 134, which is connected to selector valve 75 as previously described. A given direction of table movement always moves the same abutment 149 or 150 into dog contacting position and withdraws the other, and since the abutments are on different levels any number of dogs such as 151, 152 may be operative in either direction of table movement to change from feed to quick traverse rate, or vice-versa, at desired points without interference with similarly operative dogs for the other direction of table movement. Suitably spaced T slots 159, 160, Fig. 9 are provided for the upper and lower series of dogs.

Clutch 16 and brake a, Fig. 3, are shifted by the following mechanism. The shifter rod 25, Fig. 3 is provided with a piston 162 to which fluid may be supplied from a suitable pressure source such as a pump 163, and controlled by valve means, such as 164. Pump 163 may be of any suitable type, in this case comprising encased gears 165, 165a driven from shaft 62, the pump having inlet and outlet ports suitably arranged, receiving fluid from a reservoir in base 1, diagrammatically indicated at 167, Fig. 3, through a strainer 168 and a connecting channel 169, and delivering fluid to valve means 164 through a channel 170.

The valve means 164, Fig. 3 provides a port 171 supplied with fluid from channel 170, and the ports 172, 173 respectively connected by channels 174, 175 with the opposite ends of piston 162. A valve plunger 176 is continuously urged in one direction by a spring 177 and may be urged in the other direction by fluid pressure derived through a channel 178 as later described. When member 176 is in its spring urged position, as indicated in Fig. 3, the supply channel 170 communicates with port 173 through a valve groove 179 and the piston 162 is then urged in a direction to disengage clutch 16 and to engage brake a, the fluid from the opposite end of piston 162 being forced out through channel 174, port 172, a valve groove 180 and a drain channel 181 which delivers fluid back to reservoir 167.

But when the channel 178, Fig. 3 is connected to a source of fluid pressure, as later described, the valve plunger 176 is shifted downwardly in Fig. 3, and fluid from channel 170 then reaches the other side of piston 162 through the valve groove 180, port 172 and channel 174, waste fluid passing from the channel 175 through a drain channel 182 to permit the piston 162 to move in the direction to engage clutch 16. Pump 163 is also used for lubricating the machine as will be later described.

The control of fluid pressure in channed 178, Fig. 3, for the shifting of clutch 16 and brake a is primarily effected from a hand lever 183, Figs. 2, 12, which has two positions normally respectively effective to shift piston 162 and shifter rod 25, Fig. 3, to clutch engaged and to brake engaged positions. The control effect of hand lever 183 may, however be modified by shifting another hand lever 184, Figs. 2, 12. In one position of the lever 184 the control effect of lever 183 is the normal effect just described. In the other position of lever 184, the clutch engaged position of lever 183 is effective to engage the clutch 16 only when selector valve 75, Fig. 8, is in feed position, and when the valve is in its quick traverse position the clutch 16 is disengaged and brake a is engaged to stop spindle rotation. The means whereby these control effects are obtained is as follows:

Pressure fluid for the channel 178, Fig. 3, which controls the clutch 16 and brake a, as previously explained, is supplied through channels later described from a channel 185, Fig. 8, which also supplies other control mechanism as later pointed out. The supply of fluid to channel 185 is derived from port 93 of selector valve 75, which in the feed position of the valve, as shown in Fig. 8, is supplied with fluid from quick traverse pump 66 through port 91 and valve groove 92. In the quick traverse position of valve 75, to the left of the position shown in Fig. 8, the port 93 and channel 185 receive fluid from the motor outlet channel 82, through a valve groove 186. In either case the fluid pressure in channel 185 is controlled by a relief valve generally denoted by the numeral 187, Fig. 8, which communicates with channel 185 and port 93 through channel 188, and is of a construction similar to that of relief valves 95, 96 previously described. The connection of the relief valve 187 to the valve port 93 also provides a constant pressure outlet for the fluid from motor 71 during quick traverse movements, since the fluid is then under no necessity to pass through the back pressure device 103 previously described.

Figure 14:
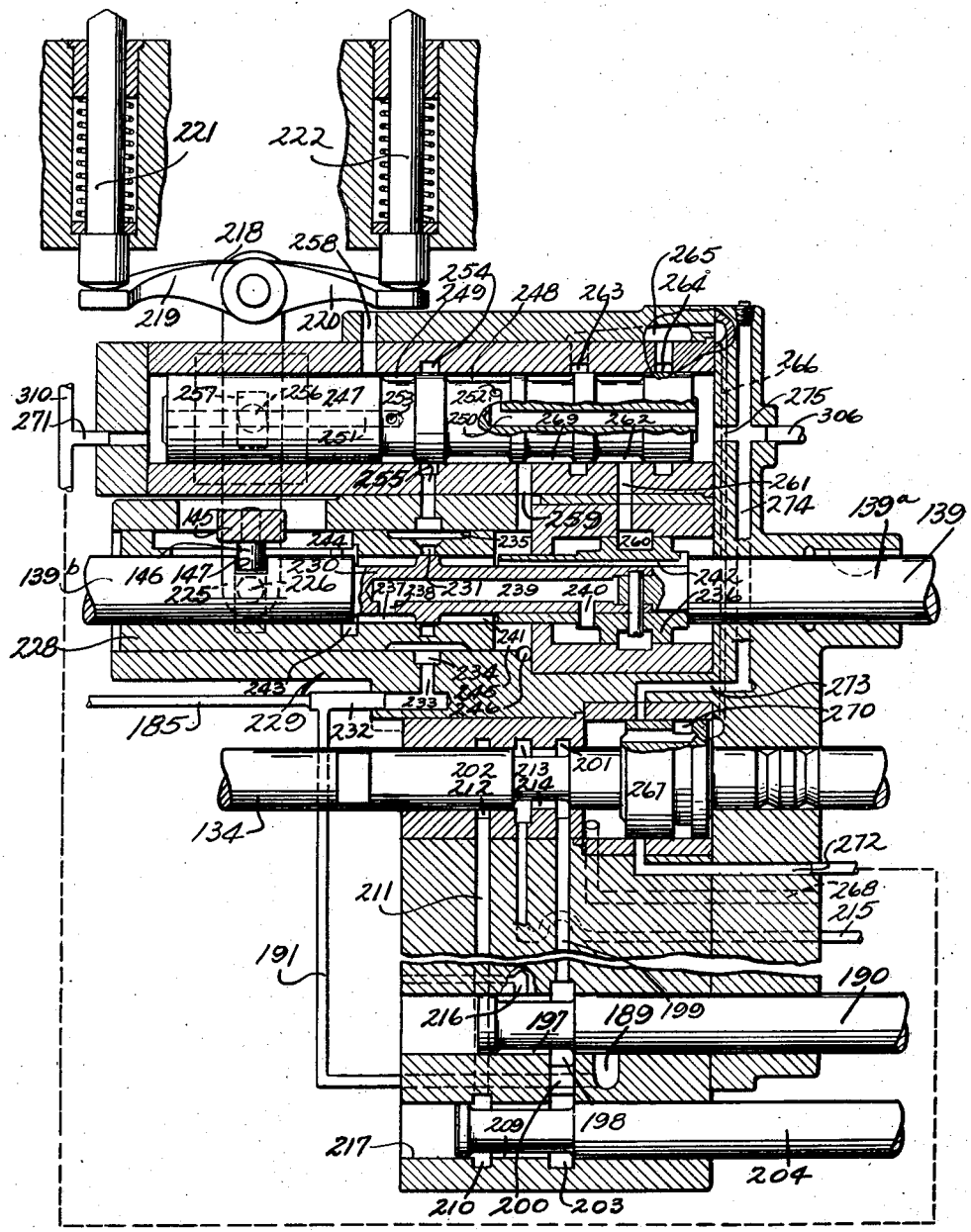
Fig. 14 is a semi-diagrammatic development corresponding to the mechanism shown at the lower right of Fig. 8 but enlarged.

Fluid from channel 185 passes to a port 189 of a valve 190 Figs. 8, 14 through a channel 191, the valve 190 being operably connected to the hand lever 183, Figs. 2, 12, by the means of a shaft 192, a lever 193, and a pin 194 engaging a slot 195 in a member 196. In the position of valve 190 as shown in Figs. 8, 14, port 189 receives no fluid, but in the other position of valve 190, to the right of the position shown in Figs. 8, 14, the fluid passes through a valve groove 197 to a port 198, and thence to channels 199 and 200 respectively leading to a port 201 of a valve 202 associated with the shifter rod 134, and to a port 203 of a valve 204, the latter valve being connected for operation from the hand lever 184, Fig. 12, by the means of a shaft 205, and an eccentric pin 206 engaging a slot 207 in a member 208, Figs. 8, 12, which is fixed on the extended stem of valve 204.

The manner of delivery of fluid to the channel 178, Fig. 3, which controls actuation of clutch shifter piston 162 and rod 25, as previously described, depends upon the position of valve 204, Fig. 14. In the position of the valve 204 there shown the fluid may pass from the channel 200 through a valve groove 209, a port 210 and thence through a channel 211 to a port 212 of the valve 202. In such case, in either position of the selector shifter rod 134, fluid will be delivered to a port 213 of valve 202 through a valve groove 214 from the one or the other of ports 201 or 212, provided that the valve 190 is in a position to the right of the position of Fig. 14. In the left hand position of valve 190, as shown in Fig. 14, no fluid will be delivered to either port 201, 212 of valve 202, the fluid being unable to pass from port 189 to port 198 of valve 190.

The port 213, Fig. 14. of valve 202 is continuously in communication with the clutch control channel 178, Fig. 3, through a channel 215 connected to channel 178 through suitable piping, and therefore, with the valve 204 in the position shown in Fig. 14, the control valve 164, Fig. 3 will be shifted to its position engaging clutch 16 whenever valve 190 is in its position to the right in Fig. 14 and irrespective of the position of valve 202; and the control valve 164 will be shifted by spring 177 to its position engaging brake *a* whenever the valve 190 is shifted to the position shown in Fig. 14, the fluid pressure then being cut off at valve 190, and the pressure immediately leaking out of the various connecting channels through a drain port 216, Fig. 14, which is exposed by the same left hand movement of valve 190 that cuts off the pressure supply from port 189.

It will therefore be apparent from previous explanation that, in the position of valve 204 as shown in Fig. 14, the clutch 16 will be engaged whenever valve 190 is shifted to the right by hand lever 183 and the brake *a* will be engaged to stop the spindle 2 and feed pump 48 whenever the valve 190 and hand lever are shifted in the other direction.

But in the other position of valve 204, to the right of the position shown in Fig. 14, no pressure fluid can reach the port 212 of valve 202, the port 210 then being closed from port 203, and in such case fluid can only pass to the channel 178 of control valve 164, Fig. 3, from port 201 of valve 202, and then only when shifter rod 134 is in its feed position as shown in Fig. 14. In the other or quick traverse position of shifter rod 134 the port 201 is closed and the fluid pressure in the channels 215, and 178 immediately leaks out through port 213, valve groove 214, port 212, channel 211, and port 210 which is then exposed to drain through the bore 217. When this occurs the valve 164 immediately shifts to its brake engaging position.

Thus, in the one position of valve 204 the control of clutch 16 and brake *a* will be from hand lever 183, which engages the clutch 16 or brake *a* independently of the feed or quick traverse position of shifter rod 134, while in the other position of valve 204 the shifting of selector shifter rod 134 to feed position engages clutch 16, provided lever 183 is in clutch engaged position, and shifting rod 134 to quick traverse position engages the brake. These control effects are independent of which of the several means here shown are used for shifting the selector valve 75 and its shifter rod 134.

It is to be noted that, irrespective of the position of shifter rod 134 and the selector valve 75, Fig. 8, the feed rate of table 2 cannot be effected unless the spindle clutch 16 is engaged to rotate the spindle 3. This is because the feed pump 48 is driven through the clutch 16 as previously explained, and therefore operates only when the clutch is engaged.

The reverser valve 74, Fig. 8, in addition to the dog control previously described for shifting it to its central or motion interrupting position, may also be dog controlled for effecting automatic reversal from either direction of movement of table 2 to the other direction. The means for effecting such dog controlled reversal is as follows:

A pivoted lever 218, Figs. 9, 13, 14 has a plurality of arms 219, 220 held normally central by spring plungers 221, 222, which may respectively be depressed to turn the lever in the one or the other direction by the means of table dogs 223, 224 Fig. 9. Another lever arm 225 carries a pin 226, Figs. 13, 14, which engages a suitable slot 227 in a sleeve 228 of a control valve generally denoted by the numeral 229, Fig. 14, the sleeve being axially movable in either direction from the normal central position shown in Fig. 14, by the operation of the dogs 222, 223. An inner member 230 of valve 229 is formed integral with the reverser shifter rod 139b, and is axially shiftable therewith.

In all positions of the valve sleeve 228, Fig. 14, fluid from the supply channel 185 is delivered to a port 231 through channels 232, 233, a port 234 and a valve groove 235. A piston 236 is fixed with shifter rod 139b, and may receive fluid pressure on the one piston face from a groove 237 of valve 229 through a radial bore 238, an axial bore 239 and another radial bore 240, or may receive fluid on the other piston face through a valve groove 241 and a passage 242. In the normal central position of valve sleeve 228 the supply port 231 is closed to both valve grooves 237, 241 as shown in Fig. 14, but as shifter rod 139 and valve member 230 are moved to right or left, the port 231 is brought into communication with the one or the other valve groove to deliver fluid to that end of the piston which will urge movement of the piston and of shifter rod 139 in the same right or left direction, at the same time opening the other valve groove and therefore the other end of the piston 236 to a drain, the drain being provided in the one instance by a port 243 which drains through a slot 244, and the drain being provided in the other instance by a chamber 245 and a drain passage 246.

In the operation just described, that is to say while sleeve 228 is in its normal or central position, the fluid pressure from valve 229 acts as detent means operating on piston 236 Fig. 14, to retain the rod 139 and reverser valve 74, Fig. 8, in either of its table operating positions, and providing a central position of valve 229 in which the reverser valve 74 may be retained in central position for effecting a table stop, as previously explained. As long as sleeve 228 is permitted to remain in central position the operation of the dogs 143 and 144, to stop table movement as previously explained, would not be altered.

But if at the time of the operation of the dogs 143, 144, the corresponding dog 223 or 224 is positioned to contact its plunger 221 or 222, whereby to suitably shift sleeve 228 to right or left, in Fig. 14, as the case may be, then the valve member 230 will pass across the position where port 231 is cut off from delivery of fluid to piston 236, and into a position where fluid pressure is urging the continued movement of piston 236 and shifter rod 139, before the dog 143 or 144 has completed its trip effect and before table movement stops. In such case, the fluid pressure from valve 229, acting on piston 236 will urge reverser valve 74 across central position and into the reverse position, thereby effecting automatic reversal of the movement of table 2. At an early point in the reverse movement the dog operating on the plunger 221 or 222 backs away from the plunger and the plunger springs force sleeve 228 again to normal central position, the fluid still continuing to operate as a detent, as previously described, retaining reverser valve 74 and shifter rod 139 in whichever position it has been forced by the automatic reversal just described.

It will also be obvious that, if the dogs 223, 224 and their connections to the sleeve 228 are such as to sufficiently shift the sleeve, then it will be unnecessary to use the dogs 143, 144 to effect an initial movement of the valve member 230, during reversal. In the present instance the dogs 143, 144 are unnecessary to effect automatic reversal, since the movement of the sleeve 228 from dogs 223, 224 is sufficient to reverse the pressure operating on piston 236 in either table operating position of the reverser shifter rod 139.

The described mechanism is sufficient for automatic table reversal but without addition the time required for reversal will vary with the rate of table travel. It is desirable at times, and particularly when table 2 is operating at slow feed rates, to have the shifting of automatic reverser sleeve 228 proceed at a relatively very fast rate, substantially independently of the rate of movement of the table, whereby to reduce the time required for reversal. To effect this result, supplemental or additional means are used for shifting sleeve 228, as follows:

A plunger 247, Figs. 8, 14 has enclosed ends whereby it may operate as a piston. At an intermediate point plunger 247 is provided with valve grooves 248, 249 respectively connecting with the opposite plunger ends through axial bores 250, 251 and suitable radial bores such as 252, 253. When the plunger 247 is shifted slightly in either direction the one or the other of grooves 248, 249 is brought into communication with a port 254 which is continuously supplied with fluid from the channel 185 through the channel 233, the annular groove which constitutes port 234 of valve 229, and a channel 255; and the plunger 247 will then be quickly shifted by the fluid pressure. Plunger 247 is connected for movement with the sleeve 228 by the means of a pin 256, Figs. 13, 14, in the same lever arm 225 which actuates the sleeve, the pin engaging a suitable slot 257 in the plunger. The fluid admitted to plunger 247 tends to quickly fully shift it in the same direction as started by dogs 223, 224 operating on the plungers 221, 222, and as a result of the arrangement described both the plunger 247 and sleeve 228 will be quickly fully shifted almost immediately following the start of the shifting of sleeve 228 in either direction from dogs 223 or 224 as previously described.

When either piston end of plunger 247 is connected to shifter fluid from the port 254, the other piston end is connected to a drain, either through a direct drain hole 258 or through a drain hole 259 leading to the chamber 245 and drain hole 246. After the completion of a reverse movement the fluid pressure is relieved on plunger 247, in a manner later described, to permit the return of the plunger and of sleeve 228 and lever 218 to their normal central positions.

It is highly desirable in order to reduce operating time and for various other reasons that at each automatic reversal of table 2 the reverse movement shall start at rapid traverse rate, but in many operations the work and cutter are engaged up to the instant of reversal, and it is then necessary that the change to quick traverse rate must not be effected prior to the actual reversal. Means are provided to insure each of these desired results as follows:

When the reverser shifter rod 139, Fig. 14, has nearly completed its shifting movement in either direction, the movement of piston 236 opens the pressure end of the piston to a port 260, which therefore receives shifter fluid in either completely shifted position of piston 236. Such fluid passes through a channel 261 to a valve groove 262 in the automatic reverse plunger 247 and is there blocked when the plunger is in its normal, central position, as in Fig. 14. But when plunger 247 is shifted in either direction as during the automatic reverse movement previously described then the one or the other of ports 263, 264 is opened to receive fluid from groove 262, and from either of these ports the fluid passes through channel 265 to a channel 266 which communicates with one end of a piston 267 fixed on the selector shifter rod 134 of the feed and quick traverse selector valve 75. The result of the described arrangement is to force the piston 267 and selector valve 75 to quick traverse position, but only during automatic reversal, and then only after the piston 236 and the reverser valve 74 have substantially completed their reversing movement. The other end of piston 267 is continuously connected to a drain channel 268 and when the automatic reverse plunger 247 is in normal central position, that is to say at all times except during automatic reversal, the channel 266 is also connected to drain through the port 263 and a valve groove 269 which then communicates with the drain channel 259, previously described. The arrangement of valve groove 269 relative to port 263 and drain channel 259 is such that in either position of plunger 247 to effect automatic reversal the last mentioned drain is cut off, but at all other times the piston 267 is drained at both ends as described and offers no resistance to movement of selector shifter rod 134 in either direction.

After the piston 267, Fig. 14, has been shifted to effect quick traverse during automatic reversal as just described, the operation of automatic reversal is complete, and it is then desirable that the fluid pressure on plunger 247 be relieved, in order that the plunger 247 and sleeve 228 may return to normal central position as soon as the reverse table movement has moved the dog 223 or 224 away from its plunger 221 or 222. This is done by the following means.

An annular groove 270 is provided in the piston 267, Fig. 14, and after the piston moves to its quick traverse position, as described, during reversal, groove 270 completes a channel connection between the two piston ends of plunger 247, the connection then including a channel 271, a channel 272 suitably connected therewith, the annular groove 270, and channels 273, 274, 275. This connection equalizes the pressure on both ends of the plunger 247, which will then be moved to central normal position by springs of plungers 221, 222, as soon as the plungers are free from the dogs. Since the pressure is equalized on plunger 247 whenever piston 267 and selector valve 75 are in quick traverse position, the plunger 247 will not operate to effect rapid shifting of sleeve 228, as above described, at such times as the reverse is to be effected from a forward table movement at quick traverse rate, but this limitation is of no importance since the fast table movement during forward quick traverse effects comparatively very rapid movement of sleeve 228 directly from the movement of the table dog and without necessity for the supplemental fluid operated shifting above described.

Still another automatic reverse means is provided, but operative only after the table has been brought against a positive stop. Such control is desirable, for instance, when the work piece is to be maintained stationary against the cutter for a period before reversal, and following a forward feeding movement. The other reverse means includes structure as follows:

Fixed on the table support or base 1 at the rear of table 2 is a unit generally denoted by the numeral 276, Figs. 5, 6, 8, having a main or body member 276a. Unit 276 includes a shiftable control valve member 277, which is normally held in central position, as in Fig. 8, by spring means as springs 278, 279, but which may be shifted axially in either direction when contacted by right or left hand dogs such as 280, adjustably mounted on table 2.

Unit 276 also includes a piston plunger 281, which is continuously urged to the right in Fig. 8, by a spring 282, the pressure of which is adjustable by the means of an adjustable abutment member 283, threaded in the body 276a and locked in adjusted position by a nut 284.

When the valve 277 is in normal central position pressure fluid from the supply channel 185, Fig. 8, is continuously delivered to the right hand or piston end of plunger 281 through a suitable connecting channel indicated by dotted line 285, Fig. 8, a channel 286, channel 287, an annular port channel 288, channel 289, a port 290, a valve groove 291, a port 292, and a channel 293. The result is to normally force the plunger 281 to the left in Fig. 8, against the resistance of spring 282, until the plunger strikes a suitable abutment such as the inner end of the adjusting screw 283. At the same time the chamber or cylinder 295 in which the plunger operates is maintained filled with liquid.

But if valve 277 Fig. 8, is moved slightly in either direction, by dogs such as 280, the pressure fluid is cut off at the one or the other of ports 290, 292, and liquid under the pressure of spring 282 immediately commences to leak out of the chamber 295, there being suitable means provided preferably of constant area, and of material resistance, such for instance as a coil of tubing 296, having a relatively small bore and connected to the chamber 295 by a channel 297 and tube 298. As the liquid leaks from chamber 295 the plunger 281 moves to the right in Fig. 8, the rate of movement being determined by the pressure exerted by spring 282 as determined by the adjustment of screw 283.

Almost immediately following the cutting off of fluid supply to chamber 295 as described, an adjustable contact member 299 carried by the dog 280 will abut the end of the body portion 276 and positively arrest the movement of table 2, which will then be maintained in this position by the fluid pressure determined by the overload relief valve 95.

At a measured interval following the described positive stop of table 2 the continued movement of plunger 281 to the right in Fig. 8 brings a valve groove 300 into simultaneous communication with the port 288 and a channel 301 leading to a port 302 of valve 277, the length of the interval being determined by the adjustment of member 283 to alter the spring pressure acting on the constant area of the leakage channel 296. In the normal central position of the valve 277 the port 302 is closed, but when the valve is shifted as described in either direction by dogs 280, and following the shifting of plunger 281, port 302 supplies fluid to one or the other of the ends of the reverser plunger 247, whereby to effect automatic reversal as previously described.

Thus, when table movement to the left in Fig. 8 has shifted valve 277 to the left, channel 301 delivers fluid to the right end of plunger 247 through a valve groove 303, a channel 304, a pipe 305 suitably connected with another pipe 306, and the channel 275. And when table movement to the right in Fig. 8 has shifted valve 277 to the right, channel 301 delivers fluid to the left end of plunger 247 through a valve groove 307, a channel 308, a pipe 309 suitably connected with another pipe 310 and the channel 271. The connections described are such that table movement in the opposite direction to the preceding movement immediately results, and always at quick traverse rate for reasons previously explained. As soon as the dog 280 has moved away from valve 277, following table reversal, the valve again assumes its normal central position and plunger 281 again is moved to the left in Fig. 8, the unit then being ready for another reversing effect.

Automatic control means are provided for adjusting feed pump 48, as follows: An eccentric cam 311, Fig. 5, is fixed on a sleeve 312 for actuation of the pump adjusting plunger 53 in a manner similar to the cam 120 previously described, and is connected for movement from a cam 313 adjustably fixed on table 2, Figs. 5, 6, through a cam follower 314 adjustably fixed on a shaft 315, a segment lever 316, also fixed on shaft 315, an idler gear 317, and a gear 318 fixed on the sleeve 312. The cam follower 314 is continuously urged against the cam 313 by a spring 319 and the pump adjusting cam 311 thus forced to adjust the pump during table movement in accordance with the configuration of cam 313. The range or ratio of feed rates thus obtained, and the table feed rate at any given position of table movement is, therefore, determined by the form and position of the cam 313, but the series of rates determined by the cam may be raised or lowered by the adjustment of cam follower 314 relative to shaft 315, an adjusting screw 320 being provided for this purpose.

The pump 163, Fig. 3, which supplies fluid for operating clutch 16 and brake a, as previously described, is also used for lubricating the machine as is more fully disclosed in a co-pending application Serial No. 86,559, filed June 22, 1936. The cylinder of piston 162 is provided with a port 321 which is opened to the pressure fluid actuating the piston but only after the piston has completed its movement in either direction, this fluid is directed to any points requiring lubrication through a channel 322 and a lubricant supply pipe 323. For the lubricating supply there is provided a pressure control valve 324, comprising a spring pressed ball 325, the excess fluid passing through a drain hole 326 to return to reservoir 167, as does also any excess or drain from the various parts lubricated from pipe 323. The system shown provides a high pressure fluid supply for the shifting of the clutch 15 and brake a, but limits the duration of high pressure to the very brief interval while the piston 162 is being shifted, thereby avoiding power waste and heating of the fluid.

What is claimed is:

1. In a machine tool the combination of a transmission mechanism including a member shiftable to alternative positions for altering the transmission effect, a piston connected for shifting said member, a cylinder for said piston, said piston having alternative positions corresponding to the member positions, a pressure fluid source, channel means for connecting said source with the opposite cylinder ends, control valve means having alternative positions respectively corresponding with the different piston positions and associated with said channel means for directing the pressure fluid to the one or the other cylinder end, and outlet channel means connected with a portion of said cylinder intermediate its ends to receive the pressure fluid only after said piston has moved to the position corresponding to the valve position.

2. In a machine tool the combination of a transmission including a member shiftable to alternative positions for altering the transmission effect, a piston connected for shifting said member and having alternative positions corresponding to the member position, a cylinder for said piston, a positive acting fluid pump, supply channel means connectible between said pump and cylinder, said cylinder providing an outlet channel, valve means associated with said supply channel means to control the connections of said pump and cylinder and having alternative positions corresponding to the piston positions, the cylinder connection of said supply channel and outlet channel being spaced to prevent communication therebetween until said piston has moved to the position corresponding to the position of said valve means.

3. In a machine tool the combination of a rotatable spindle, a reciprocable support, a spindle transmission including means shiftable for alternatively establishing or interrupting spindle rotation, a support transmission including a pressure fluid source, a fluid operable motor connected for support movement and channel means connectible between said source and motor, valve means associated with said channel means and adjustable for effecting reversal of support movement and for alternatively effecting a feed rate or a relatively fast quick traverse rate, a plurality of independently operable controllers respectively for shifting said shiftable means, for adjusting said valve means to reverse the direction of support movement, and for adjusting said valve means to change from the one to the other of said rates, shifting said valve means to effect reversal of said support substantially simultaneously with a change of rate thereof and shifting said shiftable means to effect interruption of spindle rotation, and additional control means including elements relatively adjustable to selectively include or exclude the shifting of said shiftable means in the operation of said other control means.

4. In a machine tool the combination of a tool support and a work support, a transmission including a feed rate pump, a quick traverse rate pump and a reversible motor connected for relative movement of said supports, reverser valve means having alternative forward and reverse positions, channel means connecting said reverser valve means and motor, a passageway connectible between said quick traverse rate pump and reverser valve means, shiftable valve means having alternative positions respectively opening and closing said passageway, and another passageway connecting said quick traverse rate pump and reverser valve means through said feed rate pump exclusive of said shiftable valve means.

5. In a machine tool the combination of a tool support and a work support, a transmission including a feed rate pump, a quick traverse rate pump and a reversible motor connected for relative movement of said supports, reverser valve means having alternative forward and reverse positions, channel means connecting said reverser valve means and motor, a passageway connectible between said quick traverse rate pump and reverser valve means, shiftable valve means having alternative positions respectively opening and closing said passageway, another passageway connecting said quick traverse rate pump and reverser valve through said feed rate pump exclusive of said shiftable valve means, and a plurality of relief valves respectively connected with the first mentioned passageway at a point between said quick traverse rate pump and shiftable valve means, and connected to said other passageway at a point between said feed rate pump and reverser valve means.

6. In a machine tool the combination of a tool support and a work support, a transmission including a feed rate pump, a quick traverse rate pump and a reversible motor connected for relative movement of said supports, reverser valve means having alternative forward and reverse positions, channel means connecting said reverser valve means and motor, a passageway connectible between said quick traverse rate pump and reverser valve means, shiftable valve means having alternative positions respectively opening and closing said passageway, another passageway connecting said quick traverse rate pump and reverser valve means through said feed rate pump exclusive of said shiftable valve means, and control means for said transmission including a plurality of controllers respectively connected for independent shifting of said reverser valve means and of said shiftable valve means, and another controller operable for shifting said reverser valve means and substantially simultaneously shifting said shiftable valve means.

7. In a machine tool the combination of a tool support and a work support, a transmission including a feed rate pump, a quick traverse rate pump and a reversible motor connected for relative movement of said supports, reverser valve means having alternative forward and reverse positions, channel means connecting said reverser valve means and motor, a passageway connectible between said quick traverse rate pump and reverser valve means, shiftable valve means having alternative positions respectively opening and closing said passageway, another passageway connecting said quick traverse rate pump and reverser valve means through said feed rate pump exclusive of said shiftable valve means, a plurality of manually operable controllers respectively for shifting said reverser valve means independently of said shiftable valve means and for shifting said shiftable valve means independently of said reverser valve means, and another controller invariably operable for substantially simultaneously shifting said reverser valve and shifting said shiftable valve means to the position opening the first mentioned passageway.

8. In a machine tool the combination of a tool support and a work support, a transmission including a feed rate pump, a quick traverse rate pump and a reversible motor connected for relative movement of said supports, reverser valve means having alternative forward and reverse positions, channel means connecting said reverser valve means and motor, a passageway connectible between said quick traverse rate pump and reverser valve means, shiftable valve means having alternative positions respectively opening and closing said passageway, another passageway connecting said quick traverse rate pump and reverser valve means through said feed rate pump exclusive of said shiftable valve means, a plurality of manually operable controllers respectively for shifting said reverser valve means independently of said shiftable valve means and for shifting said shiftable valve means independently of said reverser valve means, a power source having normally inoperative connections for substantially simultaneously shifting said reverser valve means and shifting said shiftable valve means to the position opening the first mentioned passageway, and another controller having alternative positions respectively connecting and disconnecting said source.

9. In a machine tool the combination of a tool support and a work support, a transmission including a feed rate pump, a quick traverse rate pump and a reversible motor connected for relative movement of said supports, reverser valve having alternative forward and reverse positions, channel means connecting said reverser valve means and motor, a passageway connectible between said quick traverse rate pump and reverser valve means, shitable valve means having alternative positions respectively opening and closing said passageway, another passageway connecting said quick traverse rate pump and reverser valve means through said feed rate pump exclusive of said shiftable valve means, a plurality of manually operable controllers respectively for shifting said reverser valve means independently of said shiftable valve means and for shifting said shiftable valve means independently of said reverser valve means, fluid operable shifters respectively connected with said reverser valve means and with said shiftable valve means, a fluid pressure source, and another controller shiftable for connecting said source and shifters for substantially simultaneously shifting said reverser valve means and shifting said shiftable valve means to the position opening the first mentioned passageway.

10. In a machine tool the combination of a tool support and a work support, a transmission including a feed rate pump, a quick traverse rate pump and a reversible motor connected for relative movement of said supports, reverser valve means having alternative forward and reverse positions, channel means connecting said reverser valve means and motor, other channel means connectible between each of said pumps and said reverser valve means, shiftable valve means controlling the connection of said other channel means to effect an alternative feed or quick traverse rate connection while continuously maintaining a driving connection from at least one of said pumps, a first controller for shifting said reverser valve means independently of said shiftable valve means, a second controller for shifting said shiftable valve means independently of said reverser valve means, and a third controller for substantially simultaneously shifting said reverser valve means and shifting said shiftable valve means to effect said quick traverse rate connection.

11. In a machine tool the combination of a tool support and a work support, a transmission including a feed rate pump, a quick traverse rate pump and a reversible motor connected for relative movement of said supports, reverser valve means having alternative forward and reverse positions, channel means connecting said reverser valve and motor, other channel means connectible between each of said pumps and said reverser valve means, shiftable valve means controlling the connection of said other channel means to effect an alternative feed or quick traverse rate connection while continuously maintaining a driving connection from at least one of said pumps, a first controller for shifting said reverser valve means independently of said shiftable valve means, a second controller for shifting said shiftable valve means independently of said reverser valve means, a third controller for substantially simultaneously shifting said reverser valve means and shifting said shiftable valve means to effect said quick traverse rate connection, and dog operable means operable in accordance with said relative support movement for operation of said second controller and subsequent operation of said third controller.

12. In a machine tool the combination of a tool support and a work support, a transmission including a feed rate pump, a quick traverse rate pump and a reversible motor connected for relative movement of said supports, a fluid reservoir for supply of fluid to said pumps, channel means connectible between said pumps and motor, reverser valve means associated with said channel means and operable for controlling the direction of said motor, shiftable valve means associated with said channel means and operable for controlling alternative motor actuation at feed or quick traverse rate, a plurality of back pressure control valves, means controlling the back pressure capacity of one of said back pressure valves in accordance with variations in the forward pressure on said motor, a plurality of outlet channels each connectible between said reverser valve means and reservoir and respectively through different of said back pressure control valves, and valve means alternatively opening or closing one of said outlet channels in accordance with the shifting of said shiftable valve means.

13. In a machine tool the combination of a tool support and a work support, a transmission including a feed rate pump, a quick traverse rate pump and a reversible motor connected for relative movement of said supports, a fluid reservoir for supply of fluid to said pumps, channel means connectible between said pumps and motor, reverser valve means associated with said channel means and operable for controlling the direction of said motor, shiftable valve means associated with said channel means and operable for controlling alternative motor actuation at feed or quick traverse rate, a plurality of back pressure control valves, means controlling the back pressure capacity of one of said back pressure valves in accordance with variations in the forward pressure on said motor, a plurality of outlet channels each connectible between said reverser valve means and reservoir and respectively through different of said back pressure control valves, and valve means alternatively opening or closing the outlet channel connected through the other of said back pressure control valves in accordance with the shifting of said shiftable valve means.

14. In a machine tool the combination of a tool support and a work support, a transmission including a feed rate pump, a quick traverse rate pump and a reversible motor connected for relative movement of said supports, a fluid reservoir for supply of fluid to said pumps, channel means connectible between said pumps and motor, reverser valve means associated with said channel means and operable for controlling the direction of said motor, shiftable valve means associated with said channel means and operable for controlling alternative motor actuation at feed or quick traverse rate, a plurality of back pressure control valves, means controlling the back pressure capacity of one of said back pressure valves in accordance with variations in the forward pressure on said motor, manually adjustable means controlling the back pressure capacity of the other of said back pressure control valves, outlet channels respectively connecting said reverser valve means and reservoir through different of said back pressure control valves, and valve means alternatively opening or closing one of said outlet channels in accordance with the shifting of said shiftable valve means.

15. In a machine tool the combination of a tool support and a work support, a transmission for relative movement of said supports including a pressure fluid supply source, a reversible fluid operable motor, and channel means connectible between said source and motor, reverser valve means associated with said channel means and operable for changing the direction of motor actuation, a power operable shifter connected with said reverser valve means, a positive stop device comprising a plunger and an abutment adapted to contact and shift said plunger during said relative movement, said device preventing said relative movement farther in the same direction following a predetermined shifting of said plunger, a power source connectible with said shifter, and means controlling the connection of said power source and shifter in accordance with the position of said plunger.

16. In a machine tool the combination of a tool support and a work support, a transmission for relative movement of said supports including a pressure fluid supply source, a reversible fluid operable motor, and channel means connectible between said source and motor, reverser valve means associated with said channel means and operable for changing the direction of motor actuation, a power operable shifter connected with said reverser valve means, a positive stop device comprising a plunger and an abutment adapted to contact and shift said plunger during said relative movement, said device preventing said relative movement farther in the same direction following a predetermined shifting of said plunger, a power source connectible with said shifter, means initially operated in accordance with the shifting of said plunger for subsequently connecting said power source and shifter, and means adjustably controlling the interval between said shifting of said plunger and said connection of the power source.

17. In a machine tool the combination of a tool support and a work support, a transmission for relative movement of said supports including a pressure fluid supply source, a reversible fluid operable motor, and channel means connectible between said source and motor, reverser valve means associated with said channel means and operable for changing the direction of motor actuation, a fluid operable shifter for said reverser valve means, a positive stop device including a plunger and an abutment adapted to contact and shift said plunger during said relative movement, said device preventing said relative movement farther in the same direction following a predetermined shifting of said plunger, a pressure fluid source connectible with said shifter, shiftable valve means controlling the connection of the pressure fluid source last mentioned, and means operative to shift said shiftable valve means following said predetermined shifting of said plunger.

18. In a machine tool the combination of a tool support and a work support, a transmission for relative movement of said supports including a pressure fluid supply source, a reversible fluid operable motor, and channel means connectible between said source and motor, reverser valve means associated with said channel means and operable for changing the direction of motor actuation, a fluid operable shifter for said reverser valve means, a positive stop device including a plunger and an abutment adapted to contact and shift said plunger during said relative movement, said device preventing said relative movement farther in the same direction following a predetermined shifting of said plunger, a pressure fluid source connectible with said shifter, shiftable valve means controlling the connection of the pressure fluid source last mentioned, means initially operated in accordance with the shifting of said plunger for subsequently shifting said shiftable valve means, and means adjustably controlling the interval between said shifting of said plunger and said shifting of said shiftable valve means.

19. In a machine tool the combination of a tool support and a work support, a transmission for relative movement of said supports including a pressure fluid supply source, a reversible fluid operable motor, and channel means connectible between said source and motor, reverser valve means associated with said channel means and operable for changing the direction of motor actuation, a fluid operable shifter for said reverser valve means, a positive stop device including a plunger and an abutment adapted to contact and shift said plunger during said relative movement, said device preventing said relative movement farther in the same direction following movement of said plunger to a predetermined position, a pressure fluid source connectible with said shifter, shiftable valve means controlling the connection of the pressure fluid source last mentioned, a fluid pressure chamber normally supplied with pressure fluid, a fluid leakage channel communicating with said chamber, a fluid operable piston, a channel connecting said piston and chamber for movement of said piston in one direction, adjustable pressure means for movement of said piston in the other direction, means for shifting said shiftable valve means to connect said pressure source and shifter in accordance with movement of said piston in said other direction. and means disconnecting the supply of pressure fluid to said chamber in said predetermined position of said plunger.

20. In a machine tool the combination of a tool support and a work support, a transmission for relative movement of said supports including a reverser, a manual controller for said reverser, and automatic control means for shifting said reverser from the one to the other of its direction positions including a power operable reverser shifter, a positive stop device comprising a plunger and an abutment adapted to contact and shift said plunger to a predetermined position during said relative movement, a fluid pressure chamber, a fluid leakage channel communicating with said chamber, a fluid operable piston, a channel connecting said piston and chamber for movement of said piston in one direction, adjustable pressure means urging said piston in the other direction, a power source, a pressure fluid source normally connected for supply of fluid to said chamber, means operable upon movement of said piston in said other direction for connecting said power source and reverser piston, and means operative upon movement of said plunger to said predetermined position to disconnect said fluid supply source and chamber.

21. In a machine tool the combination of a plurality of relatively movable supports, a transmission for said relative movement including a reversibly fluid operable motor, a fluid pressure source and channel means connectible from said source for operation of said motor in either direction, reverser valve means associated with said channel means, a power source, a power operable shifter for said reverser valve means, a member shiftable for effecting the connection of said power source and shifter, supplemental power means for shifting said member independently of support movement, a dog operable controller for connection of said supplemental power means, and a dog movable in accordance with said relative movement for operation of said controller.

22. In a machine tool the combination of a plurality of relatively movable supports, a transmission for said relative movement including a reversibly fluid operable motor, a fluid pressure source and channel means connectible from said source for operation of said motor in either direction, reverser valve means associated with said channel means, a fluid operable shifter for said reverser valve means, pump means connectible with said shifter, a control valve shiftable to connect said pump means and shifter to effect reversal of said relative movement, supplemental power means for shifting said control valve independently of support movement, a dog operable controller for said supplemental power means, and a dog movable in accordance with said relative movement for operation of said controller.

23. In a machine tool the combination of a plurality of relatively movable supports, a transmission for said relative movement including a reversibly fluid operable motor, a fluid pressure source and channel means connectible from said source for operation of said motor in either direction, reverser valve means associated with said channel means, a fluid operable shifter for said reverser valve means, pump means connectible with said shifter, a control valve shiftable to connect said pump means and shifter to effect reversal of said relative movement, a supplemental fluid operable shifter for shifting said control valve, a fluid supply source for said supplemental shifter, a dog operable controller for connection of said supply source and supplemental shifter, and a dog movable in accordance with said relative movement for operation of said controller.

24. In a machine tool the combination of a plurality of relatively movable supports, transmission mechanism for relative movement of said supports including a reversibly fluid operable motor, a pressure fluid supply source and channel means connectible between said source and motor for movement thereof alternatively in opposite directions and alternatively at feed or quick traverse rate, valve means associated with said channel means and shiftable to effect either motor direction and to effect a change from one to the other of said rates, a first controller for said valve means and operable for effecting a change in motor direction independently of a change in rate thereof, a second controller for said valve means and operable for effecting a change in motor rate independently of a change in direction thereof, a third controller for said valve means and operative for substantially simultaneously effecting a change both of motor direction and motor rate, a power source, shifter means for said third controller, a member shiftable for effecting a connection of said power source and shifter means, supplemental power means for shifting said member, a dog operable control device for connecting said supplemental power means and member, and a dog movable in accordance with said relative movement for operation of said control device.

25. In a machine tool the combination of a plurality of relatively movable supports, transmission mechanism for relative movement of said supports including a reversibly fluid operable motor, a pressure fluid supply source and channel means connectible between said source and motor for movement thereof alternatively in opposite directions and alternatively at feed or quick traverse rate, valve means associated with said channel means and shiftable to effect either motor direction and to effect a change from one to another of said rates, a first controller for said valve means and operable for effecting a change in motor direction independently of a change in rate thereof, a second controller for said valve means and operable for effecting a change in motor rate independently of a change in direction thereof, a third controller for said valve means and operative for substantially simultaneously effecting a change both of motor direction and motor rate, a fluid operable shifter for said third controller, pump means connectible for operation of said shifter, control valve means controlling the connection of said pump means and shifter, supplemental power means for shifting said control valve means, a dog operable controller for said supplemental power means, and a dog movable in accordance with said relative movement for operation of said dog operable controller.

26. In a machine tool the combination of a plurality of relatively movable supports, transmission mechanism for relative movement of said supports including a reversible fluid operable motor, a pressure fluid supply source and channel means connectible between said source and motor for movement thereof alternatively in opposite directions and alternatively at feed or quick traverse rate, valve means associated with said channel means and shiftable to effect either motor direction and to effect a change from one to another of said rates, a first controller for said valve means and operable for effecting a change in motor direction independently of a change in rate thereof, a second controller for said valve means and operable for effecting a change in motor rate independently of a change in direction thereof, a third controller for said valve means and operative for substantially simultaneously effecting a change both of motor direction and motor rate, a fluid operable shifter for said third controller, pump means connectible for operation of said shifter, control valve means controlling the connection of said pump means and shifter, a supplemental fluid operable shifter for shifting said control valve means, a fluid supply source for said supplemental shifter, a dog operable controller for connection of said supplemental source and supplemental shifter, and a dog movable in accordance with said relative movement for operation of said dog operable controller.

27. In a machine tool the combination of a plurality of relatively movable supports, a transmission for said relative movement including a reversibly fluid operable motor, a fluid pressure source and channel means connectible from said source for operation of said motor in either direction, reverser valve means associated with said channel means, a power source, a power operable shifter for said reverser valve means, a member shiftable for effecting the connection of said power source and shifter, supplemental power means for shifting said member independently of support movement, a dog operable controller for connection of said supplemental power means, a dog movable in accordance with said relative movement for operation of said controller in one direction, and automatic means for disconnecting said supplemental power means subsequent to the shifting of said member.

28. In a machine tool the combination of a plurality of relatively movable supports, transmission mechanism for relative movement of said supports including a reversibly fluid operable motor, a pressure fluid supply source and channel means connectible between said source and motor for movement thereof alternatively in opposite directions and alternatively at feed or quick traverse rate, valve means associated with said channel means and shiftable to effect either motor direction and to effect a change from one to another of said rates, a first controller for said valve means and operable for effecting a change in motor direction independently of a change in rate thereof, a second controller for said valve means and operable for effecting a change in motor rate independently of a change in direction thereof, a third controller for said valve means and operative for substantially simultaneously effecting a change both of motor direction and motor rate, a power source, shifter means for said third controller, a member shiftable for effecting a connection of said power source and shifter means, supplemental power means for shifting said member, a dog operable control device for connecting said supplemental power means and member, a dog movable in accordance with said relative movement for operation of said control device for connecting said supplemental power means and member, and automatic means for disconnecting said supplemental power means at a predetermined interval subsequent to the shifting of said member.

29. In a machine tool the combination of a plurality of relatively movable supports, a transmission for said relative movement including a reversibly fluid operable motor, a fluid pressure source and channel means connectible from said source for operation of said motor in either direction, reverser valve means associated with said channel means, a manually operable controller for shifting said reverser valve means to opposite direction positions, a fluid operable shifter for said reverser valve means, a pressure fluid source for said shifter, control valve means for altering the connection of said source and shifter and including a valve member movable in accordance with the movement of said shifter and a complementary valve member having a position normally cooperative with the first mentioned valve member to connect said pressure source and shifter to yieldably retain said reverser valve means in the direction position effected by said manual controller, a supplemental power operable shifter for said complementary valve member, a supplemental power source for said supplemental shifter, a dog operable controller for connecting said supplemental source and supplemental shifter to effect movement of said complementary valve member to a position connecting said fluid operable shifter to shift said reverser valve means to the other direction position, and a dog movable in accordance with said relative movement for operation of said dog operable controller.

30. In a machine tool the combination of a plurality of relatively movable supports, transmission mechanism for movement of said relatively movable supports including means shiftable for alternative opposite direction of movement and for effecting alternative feed or quick traverse rate, a first controller for effecting a change in direction independently of a change of rate, a second controller for effecting a change of rate independently of a change of direction, a plurality of fluid operable piston devices respectively connected for operation of said first and second controllers, a pressure fluid supply source, and control means operable to connect said source to operate said first controller piston device and subsequently invariably to operate said second controller piston device, whereby to effect a change of rate substantially simultaneously with reversal.

31. In a machine tool having a plurality of relatively movable supports and hydraulic transmission mechanism for effecting said relative movement in either of opposite directions and at either of feed or quick traverse rates, the combination of valve means shiftable for altering the rate and direction of said movement, first and second controllers respectively for shifting said valve means for independent change of direction and of rate, power operable control means for shifting said valve means for substantially simultaneously effecting a change of direction and a change of rate and including a shiftable member, a dog movable in accordance with the rate of said relative movement, and power means for shifting said member at a relatively very rapid rate and including an element contacted by said dog.

32. A machine tool as specified in claim 31 in which said power operable control means includes means limiting the operation thereof to effect a quick traverse rate immediately following reversal.

FRED A. PARSONS.
WALTER M. POHL.

CERTIFICATE OF CORRECTION.

Patent No. 2,118,358.                                                  May 24, 1938.

FRED A. PARSONS, ET AL.

It is hereby certified that error appears in the printed specification of the above numbered patent requiring correction as follows: Page 8, first column, line 41, claim 3, after the comma insert the words another controller for; and that the said Letters Patent should be read with this correction therein that the same may conform to the record of the case in the Patent Office.

Signed and sealed this 2nd day of August, A. D. 1938.

Leslie Frazer, (Seal)                                        Acting Commissioner of Patents.